Figure 1:
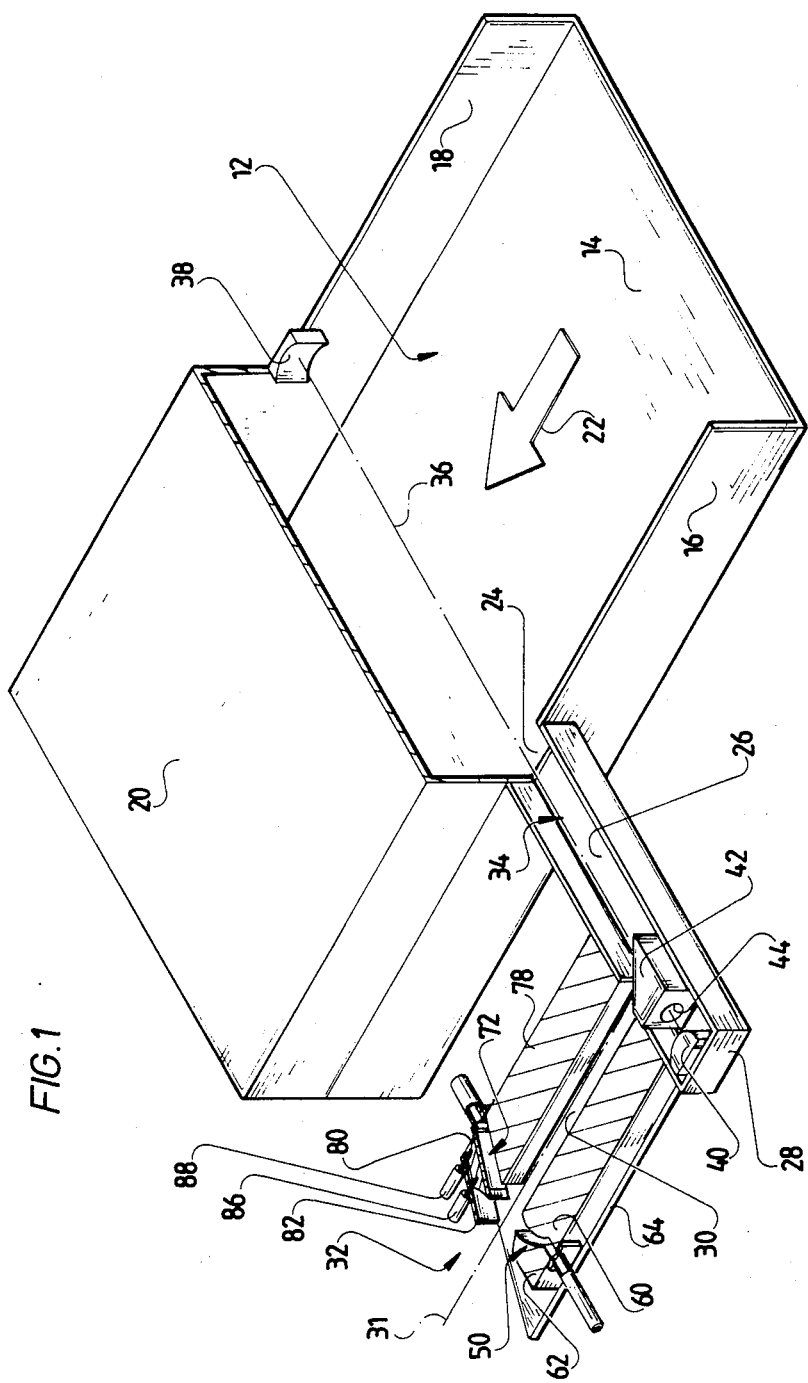

United States Patent [19]

Wildermuth et al.

[11] Patent Number: 4,821,283
[45] Date of Patent: Apr. 11, 1989

[54] AERODYNAMIC WINDOW DEVICE

[75] Inventors: Eberhard Wildermuth, Fellbach; Helmut Huegel, Sindelfingen, both of Fed. Rep. of Germany

[73] Assignee: Deutsche Forschungs-und Versuchsanstalt fuer Luft-und Raumfahrt e.V., Fed. Rep. of Germany

[21] Appl. No.: 146,019

[22] Filed: Jan. 20, 1988

[30] Foreign Application Priority Data

Jan. 22, 1987 [DE] Fed. Rep. of Germany ....... 3701718

[51] Int. Cl.⁴ .................................................. H01S 3/08
[52] U.S. Cl. ...................................... 372/104; 350/319
[58] Field of Search .......................... 372/90, 103, 104; 350/319

[56] References Cited

U.S. PATENT DOCUMENTS

| | | | |
|---|---|---|---|
| 3,907,409 | 9/1975 | Hausmann | 372/104 |
| 4,011,521 | 3/1977 | Kantrowitz et al. | 372/90 |
| 4,058,486 | 11/1977 | Mallozzi et al. | 372/5 |
| 4,206,429 | 6/1980 | Pinsley | 372/90 |
| 4,559,628 | 12/1985 | Johnson et al. | 372/104 |
| 4,617,670 | 10/1986 | Kaye | 372/104 |

OTHER PUBLICATIONS

AIAA Paper No. 75-122, 1975, "Investigation of a Free-Vortex Aerodynamic Window", R. N. Guile and W. E. Hilding.

Journal de Physique 41 (1980), pp. C9-423 to 429, "Experimental Study of a Free-Vortex Aerodynamic Window", W. Masuda and M. Yuasa.

Primary Examiner—Léon Scott, Jr.
Attorney, Agent, or Firm—Kramer, Brufsky & Cifelli

[57] ABSTRACT

In order to so improve an aerodynamic window device for a laser which isolates the laser cavity pressure and comprises a jet nozzle and a diffuser arranged opposite the jet nozzle for generating a free jet extending from the jet nozzle to the diffuser and covering an exit aperture, that variable setting of the pressure level in the laser cavity is possible, it is proposed that a side wall (80) of the diffuser (72) which faces away from the laser cavity (34) be adjustable, at least in sections thereof, relative to a free jet direction (68).

12 Claims, 5 Drawing Sheets

AERODYNAMIC WINDOW DEVICE

The invention relates to an aerodynamic window device for a laser which pressure-isolates the laser cavity and comprises a jet nozzle and a diffuser arranged opposite the jet nozzle for generating a free jet which extends from the jet nozzle to the diffuser and covers an exit aperture.

In lasers, in particular, high-energy lasers, the problem arises that the laser beam which is coupled out of the laser cavity must be guided out of it through a window which isolates the laser cavity from the ambient atmosphere since there is typically a pressure level of approximately 100 millibars in the laser cavity.

To date, solid windows have been used for coupling out the laser beam. However, these do not fulfill the requirements for high laser power as their absorption results in their becoming heated and hence deformed or even destroyed.

Accordingly, aerodynamic windows have already been discussed in several publications as a substitute for solid windows for coupling the laser beam out of the laser cavity. One of the most promising conceptions is the "Free-Vortex Aerodynamic Window" which comprises a jet nozzle which imparts to the free jet flowing across the exit aperture a speed distribution of a free vortex.

The dimensons of such an aerodynamic window have to be based on the pressure level existing in the laser cavity and no variations are allowed. Accordingly, once an aerodynamic window has been designed, the laser cavity must always be maintained at precisely that pressure level for which the aerodynamic window was designed. Otherwise a leakage occurs, which results in either ambient atmosphere flowing into the laser cavity or laser gas escaping from it. In the first case, the laser gas is contaminated with ambient air, which results in a drastic reduction of the laser power. In the second case, expensive laser gas is lost and must be replaced. Apart from these disadvantages, it is often also desirable to vary the pressure level in the laser cavity to enable optimal operation of the laser under different operating conditions.

Starting from this prior art, the object of the invention is to so improve an aerodynamic window of the generic kind that it enables variable setting of the pressure level in the laser cavity.

This object is achieved, in accordance with the invention, in an aerodynamic window device of the kind described at the beginning by a side wall of the diffuser which faces away from the laser cavity being adjustable, at least in sections thereof, relative to a free jet direction.

This adjustability of the side wall of the diffuser enables the pressure level existing in the laser cavity to be varied. Hence at pressures within a certain variation range, a leakage can be eliminated by readjustment of the side wall of the diffuser.

In a simple embodiment of the aerodynamic window device, provision is made for the entire side wall to be adjustable in its entirety.

In a further embodiment, provision can be made for a diffuser lip of the side wall which is arranged at the entrance to be adjustable, in which case, it lies within the scope of the invention for the diffuser lip to be adjustable on its own or jointly with the entire side wall.

Finally, it can similarly be advantageous for a section of the side wall at the exit which can influence a flow field within the diffuser itself to be adjustable.

In the above-described embodiment of the invention aerodynamic window device, it was not stipulated whether a side wall which faces the laser cavity and is located opposite the movable side wall is likewise to be adjustable or not. In an embodiment which is simple but nevertheless includes the inventive advantages, provision is made for a side wall facing the laser cavity to be stationary relative to the free jet direction.

Insofar as adjustability has been referred to hereinabove, this is to be understood as both parallel displacement and tilting of the side wall or sections thereof. Since the height of the diffuser, i.e., the spacing of the movable side wall from the side wall facing the laser cavity can be quite accurately determined in advance and contributes only to a minor degree to the adjustability of the pressure level in the laser cavity, provision is made in an embodiment of the inventive aerodynamic window device which is as simple as possible yet is adjustable to a sufficient degree, for the adjustable side wall or sections thereof to be tiltable relative to the free jet direction.

Alternatively or in addition to the above-described tilting, it is similarly conceivable for the adjustable side wall or sections thereof to be displaceable approximately parallel to the free jet direction. Since the free jet direction extends transversely to a longitudinal center axis of the output channel, the above-described displaceability of the side wall or sections thereof is, consequently, to be understood as displaceability transversely to the longitudinal center axis of the output channel.

In many cases, it has proven expedient for the adjustable side wall or sections thereof to be displaceable approximately perpendicularly to the longitudinal center axis of the output channel forming the exit aperture.

One of the above-described embodiments is based on the diffuser lip being adjustable. However, this involves an elaborate construction and it is, therefore, advantageous for the entire side wall, including a stationary diffuser lip, to be adjustable. In this case, it is, however, expedient for the diffuser lip of the adjustable side wall to be bent in the direction towards the side wall facing the laser cavity since this enables a more advantageous flow field in the diffuser and also improves the adjusting characteristics of such a diffuser.

Provision of adjusting elements for adjustment of the side wall or sections thereof has proven expedient. It is advantageous for these to be adjusting elements which are linearly adjustable.

In principle, the adjusting elements can be arranged in any direction in relation to one another. In an expedient embodiment, the adjusting elements are arranged parallel to one another. However, even better adjustability of the side wall or sections thereof is achievable by the adjusting elements being arranged approximately at right angles to each other.

Particularly in the latter case, it is expedient for the side wall or sections thereof to be held in an articulated manner on one of the adjusting elements and in an articulated and transversely displaceable manner on the other adjusting element. Hence the side wall is tiltable by adjustment of one adjusting element and the inside wall is linearly displaceable by adjustment of the respective other adjusting element. Here, an embodiment has proven particularly expedient in which a first adjusting element is arranged approximately parallel to the longitudinal center line of the output channel and a second adjusting element transversely, in particular, approximately at right angles, to the first adjusting element, and in which the side wall or sections thereof are held in an articulated and transversely displaceable manner on the first adjusting element and in an articulated manner on the second adjusting element.

Adjustment of the side wall is made particularly simple by the adjusting elements being in the form of adjusting or micrometer screws.

If such adjusting screws are used, it is expedient for the adjusting screws to comprise thrust members with ball heads which engage ball-shaped recesses in the adjustable sections of the side wall in order to compensate in a simple manner a tilting of the sections relative to the thrust members of the adjusting screws which occurs during adjustment.

Adjustment of the side wall or sections thereof by parallel displacement or tilting is enabled in a particularly simple manner by the adjustable side wall or each adjustable section being movably mounted by means of two adjusting screws which, in the direction of flow, engage opposite ends of these.

In the above-mentioned embodiments of the aerodynamic window device, it was left open whether adjustment is to be carried out manually or automatically. If automatic or at least remote-controlled adjustment is intended, it is advantageous for the adjusting elements to be provided with actuating devices.

For automatic readjustment in the event of leakage, it is necessary to provide the actuating devices with a control system which carries out readjustment of the side wall or sections thereof when a leakage occurs.

A leakage can be made detectable by the control system, in a particularly simple manner, by a pressure sensor arranged in the proximity of the exit aperture on the cavity side and a pressure sensor located in the region of the laser cavity being associated with the control system and indicating, in the event of a leakage, a pressure difference, thereby making a leakage evident to the control system.

In a further embodiment, as an advantageous alternative to the control system using pressure sensors, the pressure level is controlled by a gas flow sensor arranged in the proximity of the exit aperture on the cavity side.

It is expedient for this gas flow sensor to take the form of a thermal anemometer.

In all of the above-described control systems, it is, in principle, conceivable to set the pressure level of the aerodynamic window so that no gas escapes from the laser cavity and no gas enters the laser cavity from the outside. For safety reasons, it is, however, more advantageous for the control system to maintain a preselectable minimal leakage flow as such control ensures that no gas enters the laser cavity from the outside and the minimal laser gas losses are tolerable. In this case, it is particularly suitable for the control to be carried out by means of the gas flow sensor as it can detect a minimal flow of gas escaping from the laser cavity to a much more sensitive degree than the pressure sensors.

Figure 2:
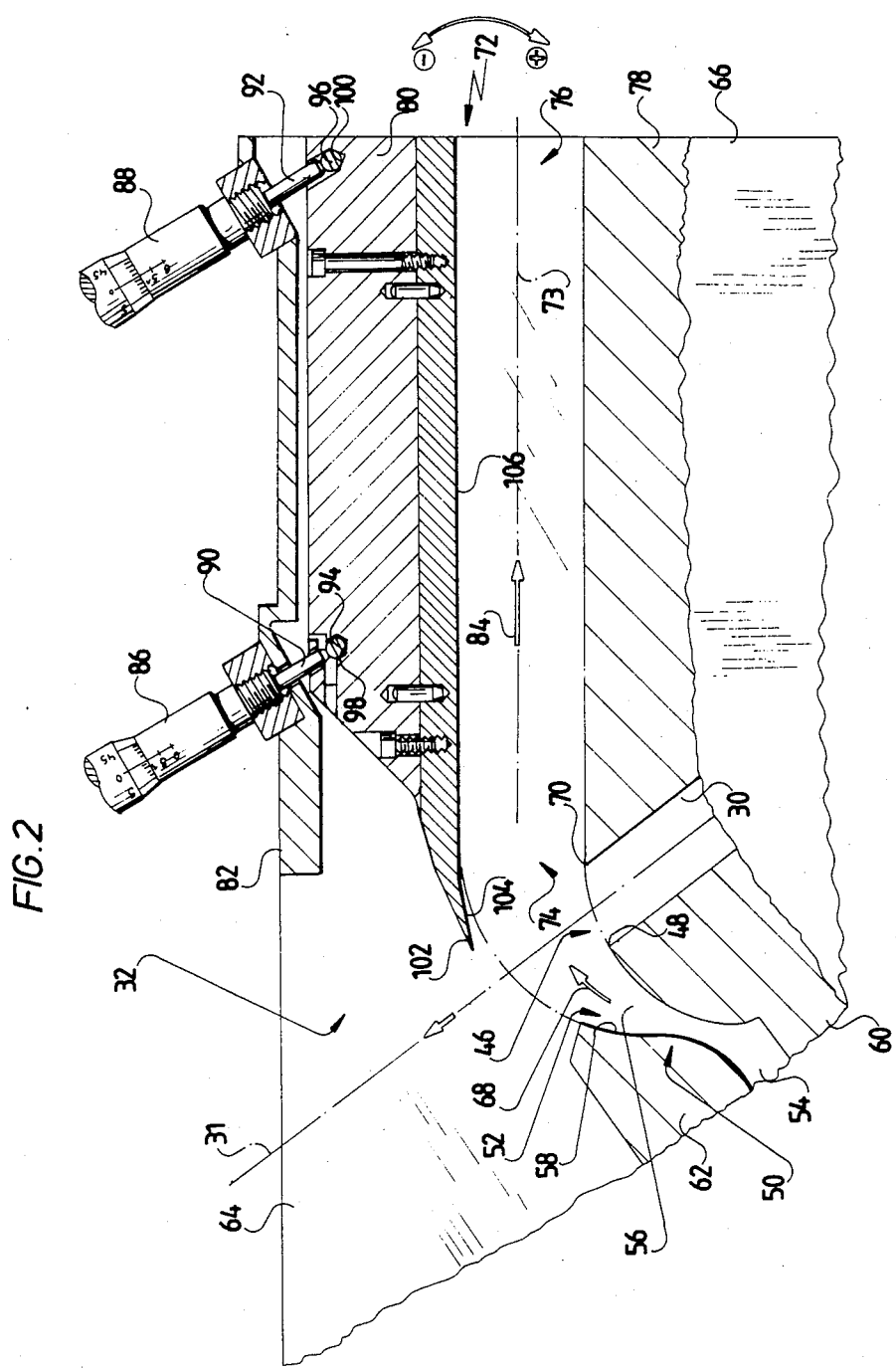
Figure 3:
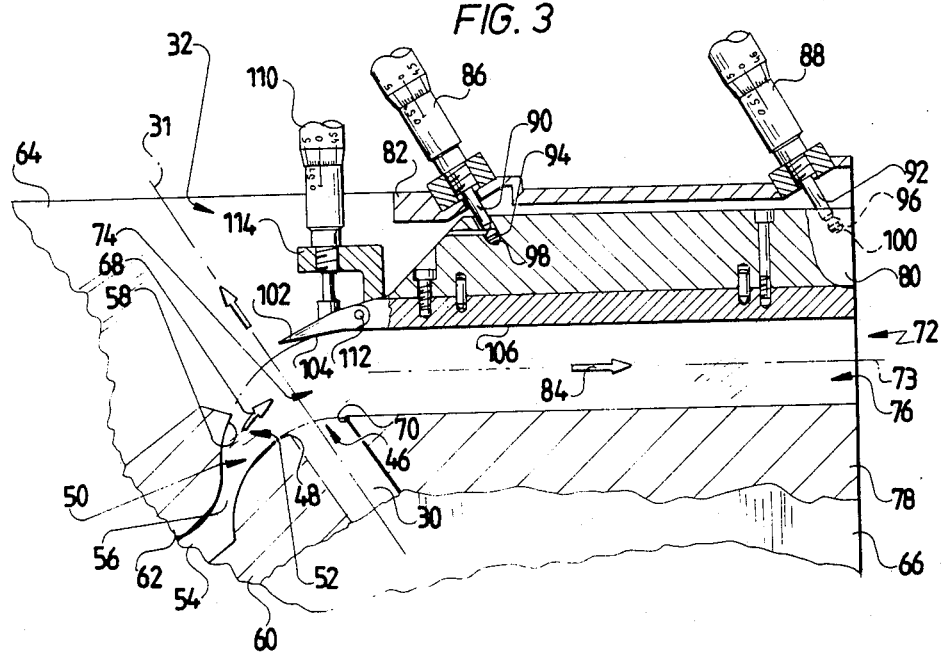
Figure 4:
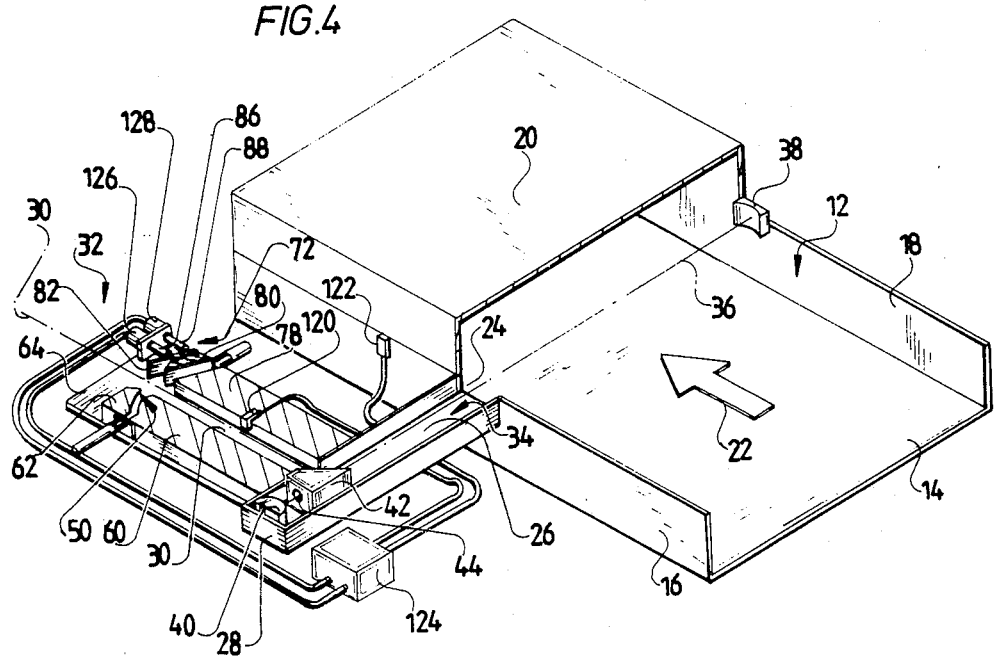
Figure 5:
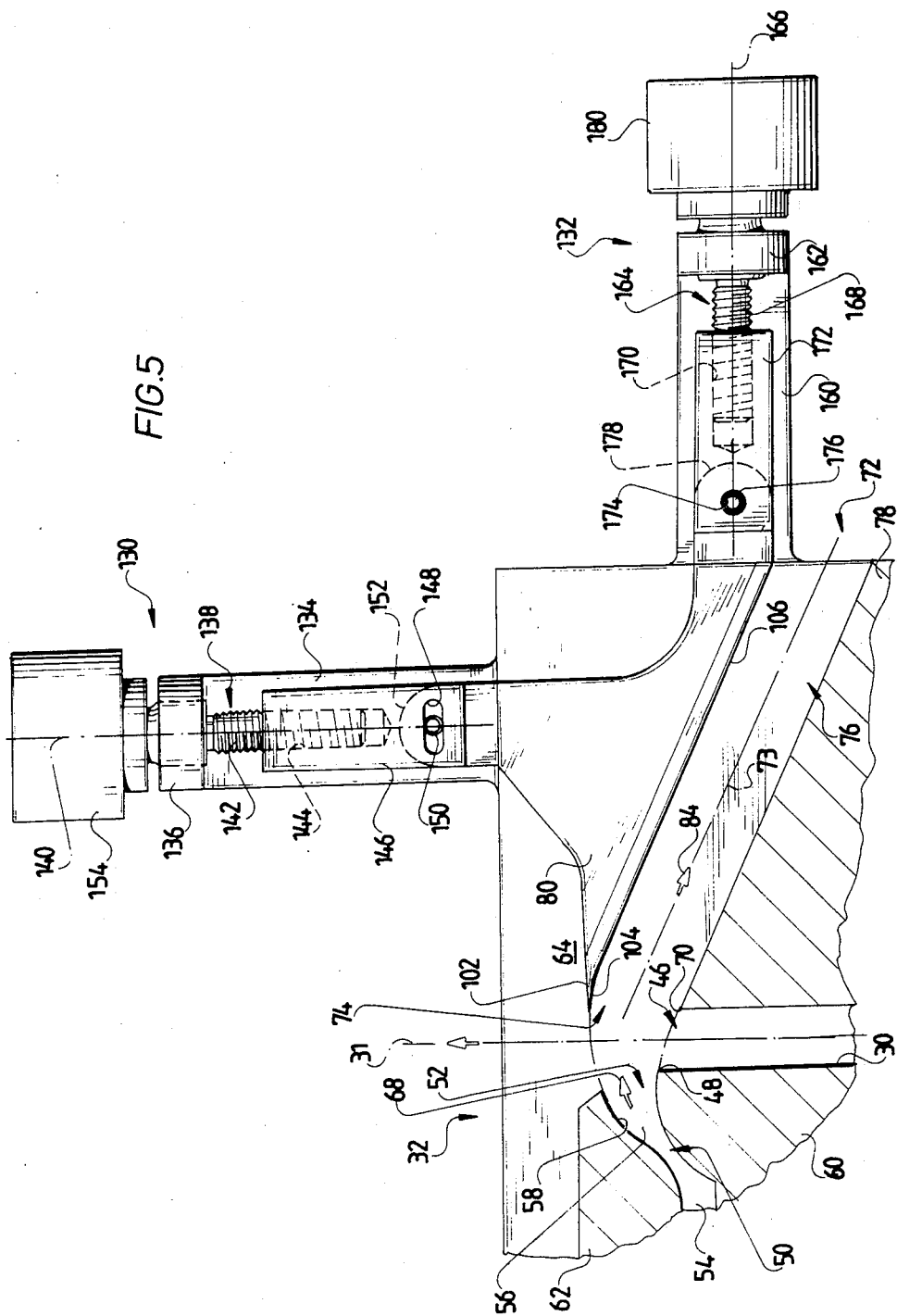
Figure 6:
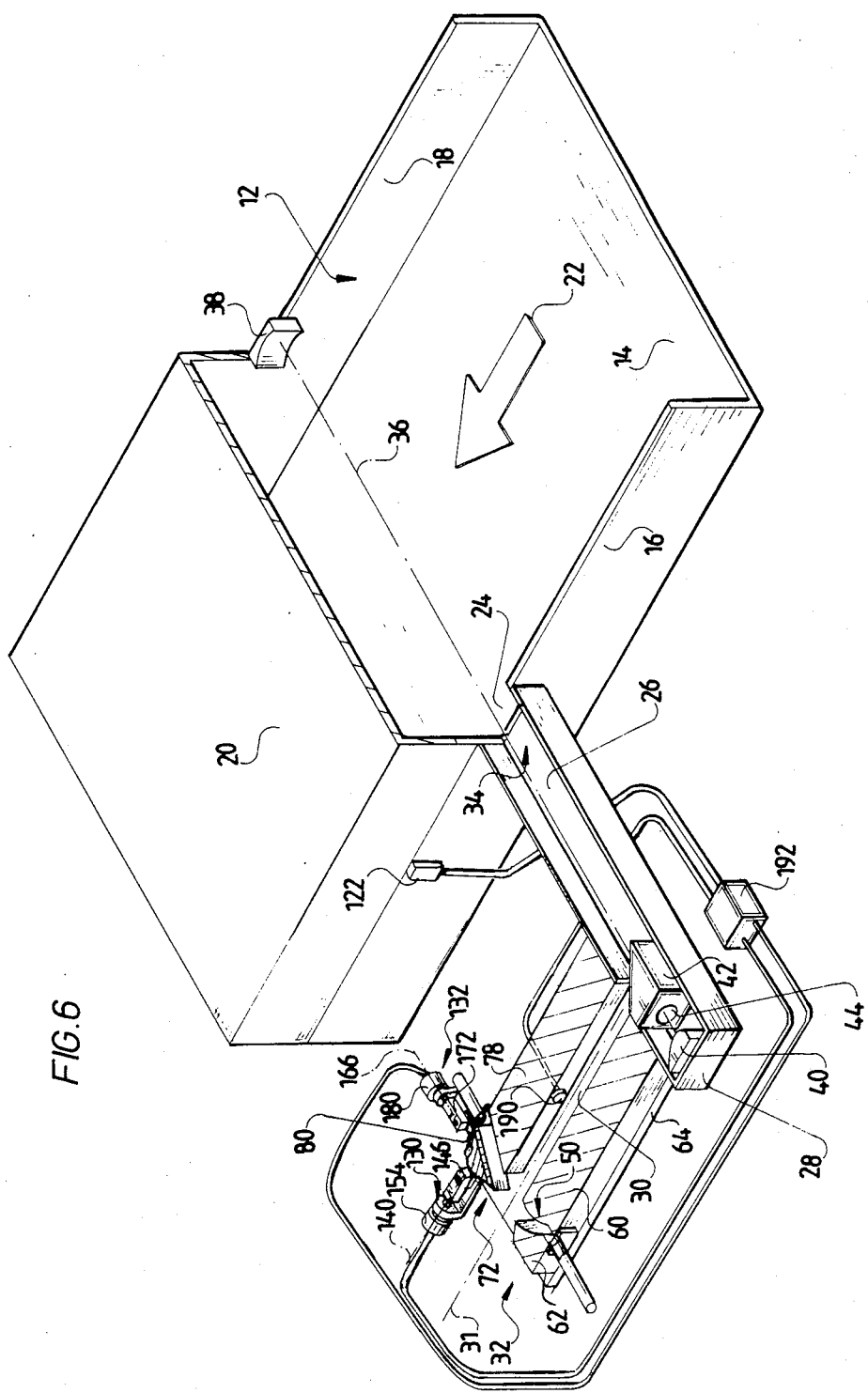

Further features and advantages of the invention will be apparent from the following description and the appended drawings of several embodiments. In the drawings:

FIG. 1 is a partly broken-open schematic illustration of a laser with a first embodiment of an aerodynamic window device;

FIG. 2 is an enlarged sectional view through the first embodiment of the aerodynamic window device shown in FIG. 1; FIG. 3 is a sectional view corresponding to FIG. 2 through a second embodiment of the aerodynamic window device; FIG. 4 is a sectional view corresponding to FIG. 2 through a third embodiment of the aerodynamic window device; FIG. 5 is a sectional view similar to FIG. 2 through a fourth embodiment of the aerodynamic window device; and FIG. 6 is a sectional view similar to FIG. 4 through a fifth embodiment of the aerodynamic window device.

A gas laser with an inventive coupling device shown in FIG. 1 comprises a gas channel 12 which is formed by a bottom section 14, two side sections 16 and 18 and a cover 20. Excited laser gas flows through this gas channel 12 in the direction of arrow 22.

Extending away from an opening 24 in the side section 16 in a direction approximately perpendicularly to the side section 16 is a side channel 26 which is closed at its end opposite the opening 24 by a rear wall 28. Adjoining this side channel 26 and extending approximatey at right angles away from it is an output channel 30 having a longitudinal center axis 31 and carrying an aerodynamic window 32 at its end facing away from the side channel 26.

Extending along a resonator axis 36 transversely to the gas channel 12 and in the longitudinal direction of the side channel 26 is a laser cavity 34. Adjustably arranged, concentrically with the resonator axis 36 are a first resonator mirror 38 on the side section 18 and a second resonator mirror 40 on the rear wall 28 of the side channel 26. The laser cavity 34 further comprises a feed-out mirror 42 arranged in front of the second resonator mirror 40. The feed-out mirror 42 is likewise concentric with the resonator axis 36 but is inclined relative to it through 45 degrees and, therefore, reflects rays into the output channel 30 which are approximately parallel to the resonator axis 36. The feed-out mirror 42 comprises a central opening 44 which allows laser rays to pass through to the second resonator mirror 40 which extend parallel to the resonator axis and up to a certain minimum spacing from it. The resonator comprising resonator mirrors 38 and 40 operates as an optically instable resonator, i.e., the first resonator mirror 38 has a concave curvature, whereas the second resonator mirror 40 has a convex curvature, with both curvatures being matched in such a way that laser rays occurring in the region of the resonator axis are first reflected back and forth several times between the resonator mirrors 38 and 40 and during this move increasingly further away from the resonator axis 36 until they can no longer pass through the opening 44 but strike the feed-out mirror 42 which reflects them into the output channel 30 from where they exit through the aerodynamic window 32.

The aerodynamic window 32, shown in an enlarged illustration in FIG. 2, comprises an exit aperture 46 of rectangular cross-section. Adjoining its side edge 48 is a jet nozzle 50 with a jet aperture 52 which extends over the entire width of the side edge 48.

The jet nozzle 50 comprises a gas supply channel 54 adjoined by a Laval nozzle 56 with a following nozzle bond 58 with a parallel supersonic flow. The nozzle bend 58 terminates with the above-described jet aperture 52. Such a jet nozzle 50 imparts a free-vortex velocity distribution to a free jet emerging from its jet aperture 52. Hence the free jet is curved in the direction of the exit aperture 46. In the region of the jet aperture, a free jet direction 68 extending approximately perpendicularly to the longitudinal center axis 31 of the output channel 30 is allocated to this free jet.

Both the gas supply channel 54 and the Laval nozzle 56 with the nozzle bend 58 are formed by two nozzle inserts 60 and 62 which lie between a base plate 64 and a cover plate 66 which, in turn, also delimit the output channel 30 in the regions extending perpendicularly to the side edge 48 and, therefore, are spaced from each other by an amount corresponding exactly to the length of the side edge 48. Hence the base plate 64 and the cover plate 66 also form side walls delimiting the free jet parallel to the free jet direction indicated by arrow 68.

Adjoining a side edge 70 of the exit aperture 46, opposite the side edge 48, is a diffuser designated in its entirety by 72, into which the free jet spanning the exit aperture 46 flows through an entrance aperture 74 facing the jet aperture 52. The diffuser 72 is aligned with its longitudinal axis 73 at an acute angle of <90 degrees to the longitudinal center axis 31 of the output channel 30.

A diffuser channel 76, similarly delimited by the base plate 64 and the cover plate 66, is delimited on its side facing the laser cavity 34 by a stationary side wall 78 which is held on the base plate 64 and the cover plate 66 and adjoins the side edge 70 of the exit aperture 46 in a flush manner.

Arranged opposite the side wall 78, i.e., facing away from the laser cavity 34, is a movable side wall 80 which terminates sealingly with the base plate 64 and the cover plate 66 but is mounted so as to be movable between these and relavitve to the stationary side wall 78.

This movable mounting of the side wall 80 is enabled by two micrometer screws 86 and 88 which, viewed in the flow direction 84 of the diffuser channel 76, are arranged in spaced relation to each other. The micrometer screws 86 and 88 are, in turn, mounted on a support plate 82 extending between the base plate 64 and the cover plate 66 and held on these.

These micrometer screws 86 and 88 comprise adjustable thrust members 90 and 92 with ball heads 94 and 96 at their ends. These ball heads engage ball-shaped recesses 98 and 100 machined in the movable side wall 80 and form together with these an articulated and, by means of the micrometer screws 86 and 88, adjustable bearing for the movable side wall 80. The movable side wall 80 forms with its wall section delimiting the diffuser channel 76 in the region of the entrance aperture 74 a diffuser lip 102 which with an inner surface 104 delimiting the diffuser channel 76 forms an angle of approximately 10 degrees relative to an inner surface 106 of edge regions located downstream in the longitudinal direction 84 of the diffuser channel 76. In other embodiments, this angle can, however, also be between 0 and 20 degrees.

Hence the inner surfaces 104 and 106 of the movable side wall 80 can be adjusted by the micrometer screws 86 and 88 in the direction of the stationary side wall 78, with both displacement parallel to the stationary side wall 78 and tilting being possible. In the case of displacement of the movable side wall 80 in the direction towards the stationary side wall 78, it has to be taken into account that due to the micrometer screws 86 and 88 including an angle of less than 90 degrees with the longitudinal direction 84 of the diffuser channel 76, parallel displacement involves simultaneous displacement of the diffuser lip 102 away from the jet nozzle 50.

The inventive aerodynamic window device functions as follows:

After the aerodynamic window device has been started up by introducing pressurized gas through the jet nozzle 50 comprising the gas supply channel 54, the Laval nozzle 56 and the nozzle bend 58, a free jet with the free jet direction 68 emerges from the jet aperture 52 of the jet nozzle 50. This free jet curves around the exit aperture 46 and enters the diffuser 72. In this embodiment, the position of the longitudinal axis 73 of the diffuser channel and the position of the stationary side wall 78 have to be calculated in accordance with the pressure difference to be attained by the free jet. In connection with calculation of such aerodynamic window devices, reference is made to the diploma thesis of E. Wildermuth entitled "Auslegung und Untersuchung eines aerodynamischen Fensters fuer Hochenergielaser" (Dimensioning and Investigation of an Aerodynamic Window for High-Energy Lasers) at the "Institut fuer Raumfahrtantriebe (Institute for Spacecarft Propulsion) of the University of Stuttgart, 1985, and to the publication "Experimental Study of a Free-Vortex Aerodynamic Window" by W. W. Masuda and M. Yuasa in *Journal de Physique* 41 (1980) C9, pages 422 to 429 and "Analytical and Experimental Investigation of a Free-Vortex Supersonic Nozzle for Aerodynamic Windows" by R. N. Guile, PhD Thesis, The University of Connecticut, 1974.

Beginning with a diffuser height, i.e., a spacing between the inner surface 106 and the stationary side wall 78 which is approximately four times the height of the jet aperture 52, the movable side wall 80 is displaced parallel to the stationary side wall 78 by means of the micrometer screws 86 and 88 until the calculated nominal pressure level in the low-pressure part, i.e., the desired pressure in the output channel 30, is reached. An optimal diffuser height is approximately three times the height of the jet aperture 52.

After this exact setting of the diffuser height, the movable side wall 80 can be tilted by actuation of one of the micrometer screws 86 or 88. With this tilting through an angle of less than plus/minus 10 degrees, departing from a parallel alignment of the movable side wall 80 relative to the stationary side wall 78, it is, for example, possible to achieve a variation range of 75 millibars to 200 millibars, beginning with a nominal pressure of 100 millibars in the output channel 30, in which case, the 75 millibars correspond to a negative tilting and the 200 millibars to a positive tilting.

Accordingly, fluctuations of the pressure level in the laser cavity can be compensated and also regulated by the tilting of the movable side wall 80. Hence in the event of a change in the laser cavity pressure, the aerodynamic window can still isolate the laser cavity from the atmosphere without a leakage occurring.

In a second embodiment, illustrated in FIG. 3, identical parts have been given the same reference numerals and, in connection with these, reference is made to the description of the first embodiment.

In contrast with the first embodiment, the diffuser lip 102 is movably mounted by means of a hinge 112 on the movable side wall 80 and is adjustable by a micrometer screw 110 held by means of an angle bracket 114 on the side wall 80 in such a way that the inner surface 104 can be set at an incline to the inner surface 106 with the angle of inclination ranging from 0 to 20 degrees.

Since, in addition, the side wall 80 is also adjustable in its entirety, separate adjustment of the inner surface 104 of the diffuser lip 102 and of the inner surface 106 is possible, and, therefore, adjustment of the latter also corresponds to adjustment of a section of the side wall 80 at the exit end.

In a third embodiment, illustrated in FIG. 4, parts which are identical with the first embodiment have similarly been given the same reference numerals.

In contrast with the first embodiment, a first pressure sensor 120 is provided in the output channel 30 in the proximity of the aerodynamic window 32 and a second pressure sensor 122 is installed in the gas channel 12 in the region of the side wall 16. The two pressure sensors 120 and 122 are in communication with a control system 124 which controls, in accordance with the pressures measured in the pressure sensors 120 and 122, one adjusting motor 126 mounted on the base plate 64 and connected to the micrometer screw 86 and one adjusting motor 128 mounted on the base plate 64 and connected to the micrometer screw 88. Once there is a leakage through the aerodynamic window 32, either in the direction towards the laser cavity 34 or out of it, a different pressure is measured by the pressure sensors 120 and 122. In this case, the control system 124 is able to readjust the movable side wall 80 of the aerodynamic window 32 by means of the adjusting motors 126 and 128 until the leakage is eliminated, i.e., the same pressure is measured by the pressure sensors 120 and 122.

In a fourth embodiment, illustrated in FIG. 5, parts identical with those of the previous embodiments have been given the same reference numerals. For a description of these parts, reference is made to the explanations of the previous embodiments.

In contrast with the first embodiment, illustrated in FIG. 2, the movable side wall 80 of the diffuser 72 is adjustable by means of two linearly displaceable adjusting elements 130 and 132.

The first adjusting element 130 comprises a base part 134 which is formed on the base plate 64 and comprises at its front end a bearing block 136 which rises up from this base part 134. A threaded spindle 138 is mounted in this bearing block 136 in a rotatable, but in the direction of its longitudinal axis 140 immovable manner. The threaded spindle 138 is aligned so that its longitudinal axis 140 extends approximately parallel to the longitudinal center axis 31 of the output channel 30. With its threaded section 142 arranged on the side of the bearing block 136 facing the side wall, the threaded spindle 138 engages a bore 144 with an internal thread in an adjusting part 146 which carries at its front end facing the side wall 80 an elongate hole 148 oriented perpendicularly to the longitudinal axis 140 but parallel to the base part 134. The adjusting part 146 is displaceably guided by the threaded spindle 138 in the direction of its longitudinal axis 140 on the base part 134.

A bolt 150 held at a guide lug 152 formed on the side wall 80 engages the elongate hole 148, and the guide lug 152 overlaps the adjusting part 146 in the region of the elongate hole 148.

On its side opposite the threaded section 142 with respect to the bearing block 136, the threaded spindle 138 is drivable and preferably connected to an adjusting motor 154. Hence the adjusting part 146 is displaceable by means of the adjusting motor 154 in the direction of the longitudinal axis 140 towards the diffuser 72 or away from it.

In the same way as the adjusting element 130, the adjusting element 132 also comprises a base part 160 formed on the base plate 64 with a bearing block 162 arranged at the end and carrying a threaded spindle 164 which with its longitudinal axis 166 is aligned approximately perpendicularly to the longitudinal axis 140 and hence also approximately perpendicularly to the longitudinal center axis 31 of the output channel 30.

In addition, a threaded section 168 engages a bore 170 with an internal thread in an adjusting part 172 which is provided with a bearing bore 174 at its end facing the side wall 80. Likewise engaging this bearing bore 174 is a bolt 176 which is held at a guide lug 178 of the side wall which similarly overlaps the adjusting part 172.

In the same way as the threaded spindle 138, the threaded spindle 134 is also rotatable by an adjusting motor 180 arranged opposite the threaded section 168 with respect to the bearing block 162.

This fourth embodiment functions as follows:

Rotation of the threaded spindle 138 of the first adjusting element 130 causes the adjusting part 146 to be displaced and, therefore, by way of the bolt 150 engaging the elongate hole 148, the side wall 80 is tilted in the direction of the side wall 78 about the bolt 176 rotating in the bore 174. Hence the diffuser lip 102 moves towards the side edge 70 of the exit aperture 46, which results in an overall reduction in the cross-sectional area of the entrance aperture 74 of diffuser 72. This enables rough adjustment of the pressure level in the laser cavity 34.

Fine adjustment, on the other hand, is carried out by actuation of the threaded spindle of the second adjusting element 132 by means of the adjusting motor 180. The threaded spindle moves the side wall 80 in the direction of the longitudinal center axis 31 of the output channel 30 by means of the adjusting part 172 and so the diffuser lip 102 is spaced at a smaller or larger distance, respectively, from the longitudinal center axis 31. Displacement of the side wall 80 is enabled by the bolt 150 being movable in the elongate hole 148 of the adjusting part 146 perpendicularly to the longitudinal center axis 31. This adjusting motion of the threaded spindle 164 similarly results in an overall change in the cross-sectional area of the entrance aperture 74 but to a considerably smaller degree, whereby fine adjustment of the pressure level attainable by the aerodynamic window 32 in the laser cavity 34 is possible.

In a variant of this fourth embodiment, it is, however, likewise possible to adjust the side wall 80 by hand. In this case, the adjusting motors 154 and 180 have to be replaced by corresponding hand-operated adjusting wheels.

A fifth embodiment, illustrated in FIG. 6, uses the fourth embodiment of the aerodynamic window shown in FIG. 5 to automatically control the pressure level in the laser cavity 34. Accordingly, parts identical with those of previous embodiments have the same reference numerals and reference is made to the previous embodiments for a description of these parts.

In contrast with the third embodiment, a pressure sensor in the proximity of the exit aperture 46 of the laser beam is not used in the fifth embodiment but instead a thermal anemometer 190 which protrudes into the output channel 30 and is able to detect a flow of gas in the output channel 30 along the longitudinal center axis 31 in the direction of the aerodynamic window.

With the flow rate values of the flow of gas determined by the anemometer 190, the control system 192 is able to actuate both the adjusting motor 154 and the adjusting motor 180, with large flows first resulting in rough adjustment by means of the adjusting motor 154, and slight changes then being subsequently carried out by means of the adjusting motor 180. Hence the control system 192 is able to keep a flow of gas through the output channel 30 in the direction of the aerodynamic window 32 to a minimum, with the result that laser gas constantly leaves the laser cavity 34 by this "leakage flow" can be regulated so as to remain at a minimal level. Therefore, on the one hand, atmosphere is prevented from entering the laser cavity 34 and, on the other hand, the laser gas loss can be kept as small as possible.

In a practical embodiment of the invention aerodynamic window device, the aerodynamic window is controlled by a pressure measurement being made by the pressure sensor 122 when the laser is started up and by the pressure adjustment being carried out on the basis of this measurement by means of the adjusting motor 154, whereas during operation a flow measurement is made by means of the thermally operating anemometer and this measurement is used for the fine adjustment by means of the adjusting motor 180.

What is claimed is:

1. Aerodynamic window device for a laser for pressure isolation of the laser cavity, comprising: a jet nozzle and a diffuser arranged opposite said jet nozzle for generating a free jet extending from said jet nozzle to said diffuser and covering an exit aperture, characterized in that a side wall (80) of said diffuser (72) which faces away from said laser cavity (34) is adjustable, at least in sections thereof, relative to a free jet direction (68).

2. Aerodynamic window device as defined in claim 1, characterized in that said entire side wall (80) is adjustable.

3. Aerodynamic window device as defined in claim 2 or 10, preceding claims, characterized in that said adjustable side wall (80) or sections (102) thereof are displaceable approximately parallel to said free jet direction (68).

4. Aerodynamic window device as defined in claim 2 or, characterized in that said adjustable side wall (80) or sections (102) thereof are displaceable approximately perpendicularly to a longitudinal center axis of an output channel (30) forming said exit aperture (46).

5. Aerodynamic window device as defined in claim 2 or 10, characterized in that adjusting elements (86,88; 130,132) are provided for adjustment of said side wall (80) or sections (102) thereof.

6. Aerodynamic window device as defined in claim 5, characterized in that said adjusting elements (86,88; 130,132) are provided with actuating devices (126, 128; 154,180).

7. Aerodynamic window device as defined in claim 6, characterized in that a control system (124;192) is provided or said actuating devices (126,128; 154,180) which readjusts said side wall (80) or sections (102) thereof when a leakage occurs.

8. Aerodynamic window device as defined in claim 7, characterized in that a pressure sensor (120) arranged in the promimity of said exit aperture (46) on the cavity side and pressure sensor (122) located in the region of said laser cavity (34) are associated with said control system (124).

9. Aerodynamic window device as defined in claim 7, characterized in that said control system (192) is provided with a gas flow sensor (190) arranged in the proximity of said exit aperture (46) on the cavity side.

10. Aerodynamic window device as defined in claim 1, characterized in that a diffuser lip (102) of said side wall (80) which is arranged at the entrance end is adjustable.

11. Aerodynamic window device as defined in one of claims 1 to 10, characterized in that said adjustable side wall (80) or sections (102) thereof are tiltable relative to said free jet direction (68).

12. Aerodynamic window device as defined in claim 1, characterized in that said diffuser lip (102) of said adjustable side wall (80) is bent in the direction towards said side wall (78) facing said laser cavity (34).

* * * * *